(12) United States Patent
Utzinger (10) Patent No.: US 9,114,735 B2
(45) Date of Patent: Aug. 25, 2015

(54) VEHICLE SEAT (75) Inventor: Karl Utzinger, Weselberg (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 21 days.

(21) Appl. No.: 13/982,727

(22) PCT Filed: Mar. 6, 2012

(86) PCT No.: PCT/EP2012/000988
§ 371 (c)(1),
(2), (4) Date: Nov. 18, 2013

(87) PCT Pub. No.: WO2012/136294
PCT Pub. Date: Oct. 11, 2012

(65) Prior Publication Data
US 2014/0291468 A1 Oct. 2, 2014

(30) Foreign Application Priority Data
Apr. 7, 2011 (DE) .......................... 10 2011 017 378

(51) Int. Cl.
B60N 2/075 (2006.01)
B60N 2/08 (2006.01)
B60N 2/07 (2006.01)

(52) U.S. Cl.
CPC ............ *B60N 2/0881* (2013.01); *B60N 2/0705* (2013.01); *B60N 2/0715* (2013.01); *B60N 2/0722* (2013.01); *B60N 2/0806* (2013.01); *B60N 2/0818* (2013.01); *B60N 2/0875* (2013.01)

(58) Field of Classification Search
USPC ................................ 248/424, 429; 297/344.1
See application file for complete search history.

(56) References Cited

U.S. PATENT DOCUMENTS

| 7,717,490 | B2 * | 5/2010 | Kojima et al. ............. 296/65.13 |
| 2005/0103968 | A1 * | 5/2005 | Yamada et al. ................ 248/429 |
| 2011/0233367 | A1 * | 9/2011 | Mizuno et al. ................ 248/429 |
| 2011/0233368 | A1 * | 9/2011 | Nihonmatsu et al. ......... 248/429 |
| 2011/0233369 | A1 * | 9/2011 | Nihonmatsu et al. ......... 248/429 |
| 2013/0214112 | A1 * | 8/2013 | Kawamura et al. ........... 248/429 |
| 2014/0027600 | A1 * | 1/2014 | Kato et al. .................... 248/429 |

FOREIGN PATENT DOCUMENTS

| DE | 100 50 959 A1 | 5/2002 |
| WO | WO-2010/051903 A1 | 5/2010 |

OTHER PUBLICATIONS

International Search Report in PCT/EP2012/000988 dated May 8, 2012.
International Preliminary Report on Patentability mailed Oct. 8, 2013, as received in corresponding International Patent Application No. PCT/EP2012/000988.

\* cited by examiner

*Primary Examiner* — Steven Marsh
(74) *Attorney, Agent, or Firm* — Foley & Lardner LLP

(57) ABSTRACT

A longitudinal adjuster for a vehicle seat, has a pair of seat rails, with a first seat rail which is fixed on the structure, a second seat rail which is guided in said first seat rail and is connected to the vehicle seat, and a releasable locking device with at least one latching plate for releasably locking the position of the first seat rail in relation to the second seat rail. A four-bar linkage, which interacts with the latching plate or the latching plates in order to unlock the longitudinal adjuster, is provided within the second seat rail.

9 Claims, 9 Drawing Sheets

VEHICLE SEAT

CROSS REFERENCE TO RELATED APPLICATIONS

The present application is a National Stage of International Application No. PCT/EP2012/000988 filed on Mar. 6, 2012, which claims the benefit of German Patent Application No. 10 2011 017 378.1 filed on Apr. 7, 2011, the entire disclosures of which are incorporated herein by reference.

The invention relates to a longitudinal adjuster for a vehicle seat.

PRIOR ART

WO 2010 051903 A1 discloses a longitudinal adjuster for a vehicle seat having a first and a second seat rail. In this instance, a releasable locking device for releasably locking the position of the first seat rail with respect to the second seat rail is provided, the first seat rail being constructed with catches which are arranged in at least one row which extends in a longitudinal direction of the seat, and each catch having a front flank and a rear flank in the longitudinal direction of the seat.

At least two catch plates are provided for locking the first seat rail to the second seat rail, the catch plates being movably supported in the second seat rail in a locking direction and having teeth for engaging in the catches of the first seat rail. The guiding in the second seat rail is carried out by means of a guiding pin, which protrudes in the locking direction from the base member of the catch plate and engages with play through a guide opening in the second seat rail.

A tension spring which is suspended, on the one hand, on the associated catch plate and, on the other hand, on the second seat rail, pretensions the catch plate in the locking direction against the second seat rail. In order to unlock the longitudinal adjuster, there are provided on each second seat rail a pivotably supported unlocking flap and, between the two second seat rails, a pivotably supported transverse pipe which extends in a transverse direction and which has an arm which protrudes toward the rear at each vehicle seat side and a lever which protrudes forward between the two vehicle seat sides, and which is accessible at the front end of the vehicle seat in the longitudinal direction of the seat.

By the lever being pivoted upward, the transverse pipe rotates and pivots the two arms downward. Each arm acts on the associated unlocking flap, which itself acts on the guiding pins of the three associated catch plates so that they are moved counter to the locking direction and thereby leave the catches. The second seat rails can then be moved relative to each other.

OBJECT

An object of the invention is to improve a longitudinal adjuster for a vehicle seat of the type mentioned in the introduction.

SOLUTION

This object is achieved according to the invention by a longitudinal adjuster having the features of claim 1. Advantageous embodiments are set out in the dependent claims.

According to the invention there is provided in this instance within the second seat rail a four-bar linkage, in particular a parallelogram, which cooperates with the catch plate(s) in order to unlock the longitudinal adjuster. This arrangement can be arranged completely within the seat rail profile so that a protected position is produced together with a small structural space requirement.

There are preferably provided in this instance two coupling elements which are pivotably secured to a rail at one end and whose other ends are connected to a stop, which can be moved relative to the catch plate(s), in particular the catch plates for unlocking from the locking position thereof.

The actuation of the four-bar linkage is preferably carried out by means of a gear connection, in particular a toothed wheel region which is formed on a drive element and which cooperates by means of the outer tooth arrangement thereof with tooth arrangements which are arranged at opposing sides within elongate holes.

The longitudinal adjuster preferably has a memory device which, when the locking device is unlocked, is activated by means of a second actuation device, which is different from the normal, manual, first actuation device, in particular formed by a handle which is secured to the seat.

A vehicle seat having a corresponding longitudinal adjuster may, for example, be used in a passenger motor vehicle or a utility vehicle, the seat not necessarily having to be the driver's seat. Such a vehicle seat is preferably provided in a front seat row, but it can also be provided in a central or rear seat row, for example, also in the case of a van.

FIGURES AND EMBODIMENTS OF THE INVENTION

The invention is explained in greater detail below with reference to advantageous embodiments illustrated in the drawings. However, the invention is not limited to these embodiments. In the drawings.

Figures 16, 17:
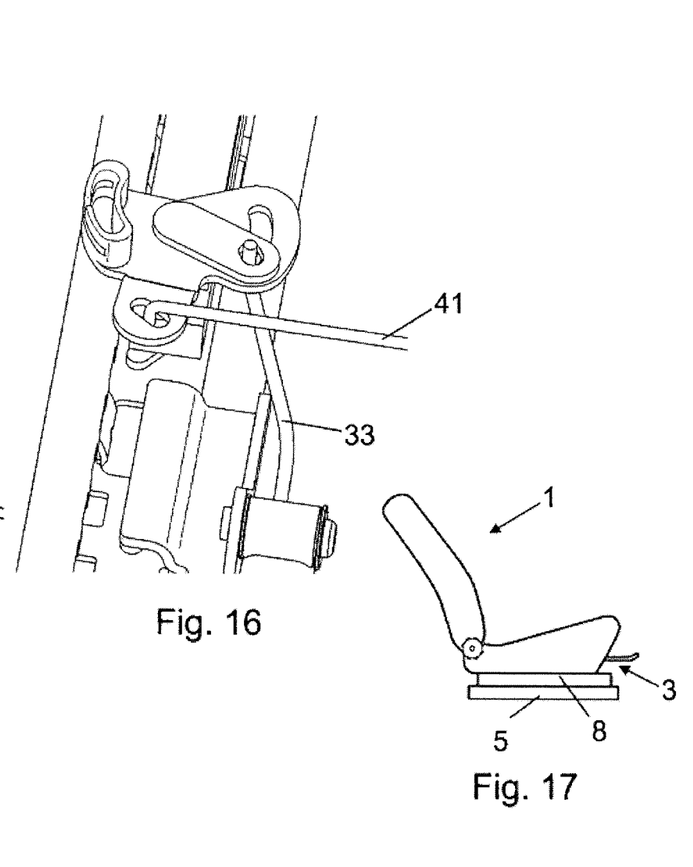
FIG. 16 is a detailed view of FIG. 14
FIG. 17 is a schematic side view of a vehicle seat having two seat rail pairs.

A vehicle seat 1 of a motor vehicle has a longitudinal adjuster 3, by means of which the vehicle seat 1 can be longitudinally adjusted, that is to say, the longitudinal seat position thereof can be adjusted in the longitudinal seat direction x. The longitudinal seat direction x generally extends parallel with the travel direction. The manually actuatable longitudinal adjuster 3 has at each of the two vehicle seat sides a first seat rail 5, which is connected to the vehicle structure of the motor vehicle, and a second seat rail 8, which can be displaced relative to the associated first seat rail 5 in the longitudinal seat direction x and which can be locked to that first seat rail 5.

The first seat rail 5 and the second seat rail 8 mutually engage around each other with their substantially U-shaped profile-members with inwardly or outwardly bent longitudinal edges with balls which are not illustrated in greater detail being interposed. The balls are used both for mutual guiding and for reducing the friction between the seat rails 5 and 8.

In the present embodiment, there are arranged at each vehicle seat side in each of the four corners of the common seat rail profile of the two metal seat rails 5 and 8 two packets each comprising three balls with specific spacings one behind the other in the longitudinal seat direction x, the metal balls being retained by a total of two ball retention members of plastics material.

In order to lock the first seat rail 5 and second seat rail 8, there are provided at each vehicle seat side three catch plates 12 which are each movably guided in the locking direction z in the second seat rail 8 and which are constructed for cooperation with the first seat rail 5. Each catch plate 12 has a flat base member 12a, which extends in the longitudinal seat direction x and from which, at both longitudinal sides of the base member 12, in this instance precisely two teeth 12b protrude in a transverse direction y, that is to say, a front tooth 12b in a longitudinal seat direction x and a rear tooth 12b in a longitudinal seat direction x. Alternatively, the catch plates may also have a different number of teeth.

The catch plates 12 are positioned in the second seat rail by means of tension springs 14 which are suspended, on the one hand, on the associated catch plate 12 and on a base carrier 15a which is securely connected to the second seat rail 8. The tension springs may alternatively also be suspended directly in the second seat rail 8. The tension springs 14 tension the catch plates 12 in the locking direction z against the second seat rail 8, the position of the catch plates 12 being able to be changed in the locking direction z by means of a frame-like stop 15b, the other function of which will be explained in greater detail below.

In the locked rest state, however, the stop 15b does not adjoin the catch plates 12 but is ideally lifted completely upward so that it is in abutment with the base carrier 15a. The catch plates 12 are limited in their upward movement by means of their engagement in the first seat rail 5.

The guiding of the catch plates 12 in the second seat rail 8 is carried out by means of a guiding pin 12c which protrudes in the locking direction z from the base member 12a of the catch plate 12 and engages with play through a guide opening 15a' in the base carrier 15a and a guide opening 8a which is in alignment therewith in the second seat rail 8. The guide openings 8a, 15a' are preferably constructed with a slightly larger cross section than the guiding pin 12c in order to provide play compensation possibilities.

The longitudinal seat direction x, the transverse direction y and the locking direction z are located perpendicularly relative to each other and form a right-handed system. Each tooth 12b has in this instance a rectangular profile in the x-z plane and in the x-y plane, all the teeth having the same dimensions. With regard to the function of the catch plates 12 together with the seat rails 5, 8, reference is made as a locking device 21 to DE 100 50 959 B4, whose content is expressly incorporated herein by reference.

In order to unlock the longitudinal adjusters 3, there is provided at a seat side adjacent to the corresponding seat rail pair 5, 8 a handle 31, which is fitted to the second seat rail 8 so as to be able to be pivoted about an axis which extends in the transverse direction y and which is formed by a retention member which is secured to the rail with bearing pins and bearing bushes. The handle 31 forms a (first) actuation device in order to unlock the locking device 21. On the handle 31 there is formed a lever arm 32 which extends in a radial direction from the axis and which is arranged in a position for use so as to extend substantially downward in the locking direction z and to the free end of which a first transmission rod 33 is fitted so as to be able to be pivoted with respect to the lever arm 32.

Figures 1, 2:
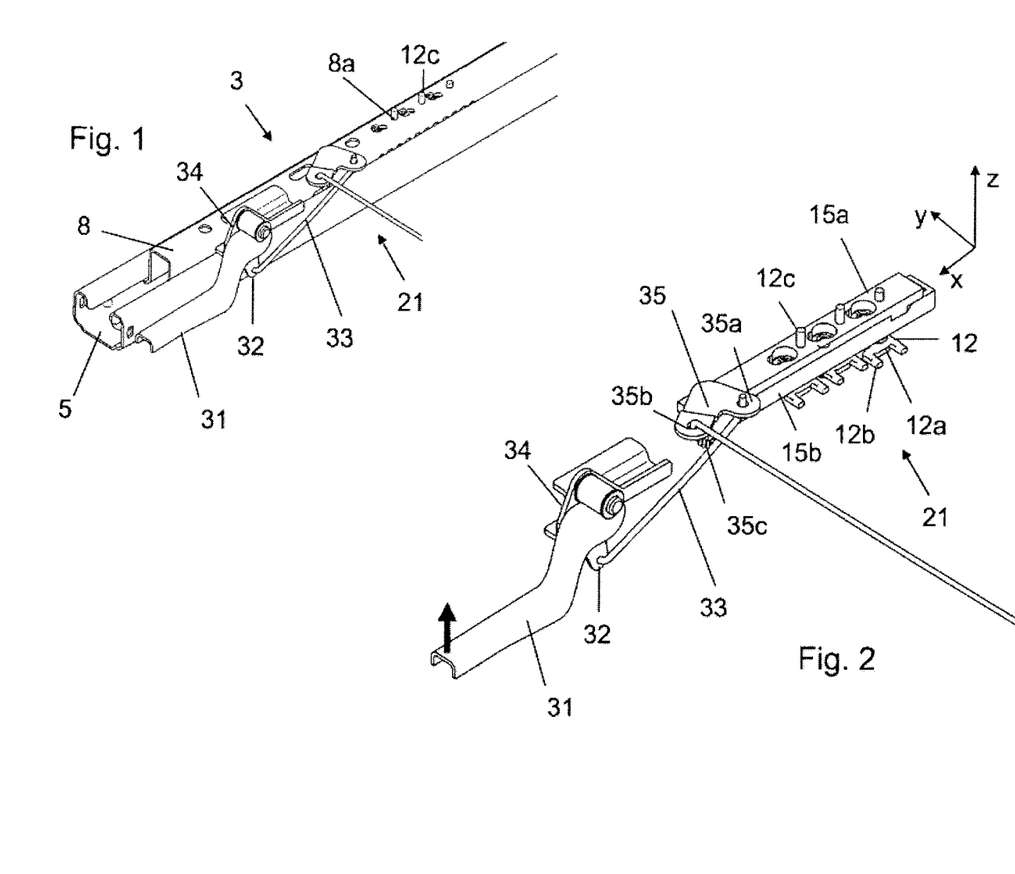
FIG. 1 is a perspective sectioned view of a locked seat rail pair for a longitudinally adjustable vehicle seat having a locking device according to the first embodiment.
FIG. 2 is a view corresponding to FIG. 1 without the seat rails being illustrated.
Figure 3:
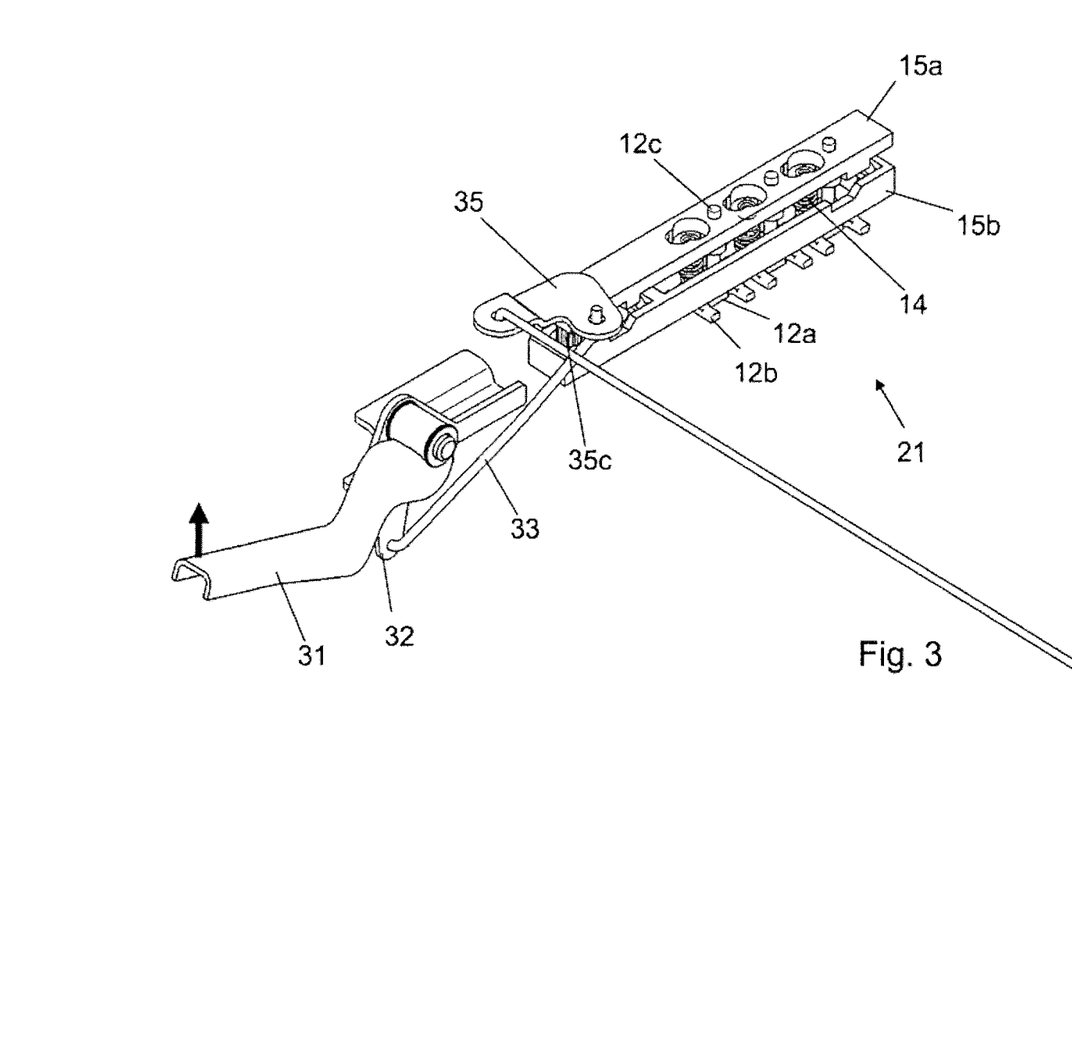
FIG. 3 is a view corresponding to FIG. 2 in an unlocked position.

In order to return the handle 31 to the initial position illustrated in FIG. 1, a restoring spring 34 is provided which is arranged so as to extend around the bearing pin and is supported both on the retention member and on the handle 31. The structure and the function of the seat rail locking system of the seat rail pair 5, 8 close to the handle will first be described below.

The first transmission rod 33 is suspended in an engagement opening 35a' in a first arm 35a of a drive element 35, which is arranged in the x-y plane. The drive element 35 has a second arm 35b, which extends substantially at a right angle with respect to the first arm 35a, also within the x-y plane. The second arm 35b serves to transmit movement to the locking system of the second seat rail pair 5, 8, which will be discussed in greater detail below.

In the central region of the drive element 35, a cylindrical actuation region 35c which is constructed with a tooth arrangement extends downward in the locking direction z. The two arms 35a, 35b extend in a radial direction with respect to the longitudinal center axis of the actuation region 35c. The actuation region 35c protrudes through corresponding openings in the second seat rail 8, the base carrier 15a and the stop 15b. In this instance, the openings in the second seat rail 8 and the opening in the base carrier 15a which is securely fitted thereto mutually correspond, the opening 15a" in the base carrier 15a being constructed as an elongate hole, at the one longitudinal side of which a tooth arrangement 15a''' is constructed, with which the tooth arrangement of the actuation region 35c is in engagement.

Figure 4:
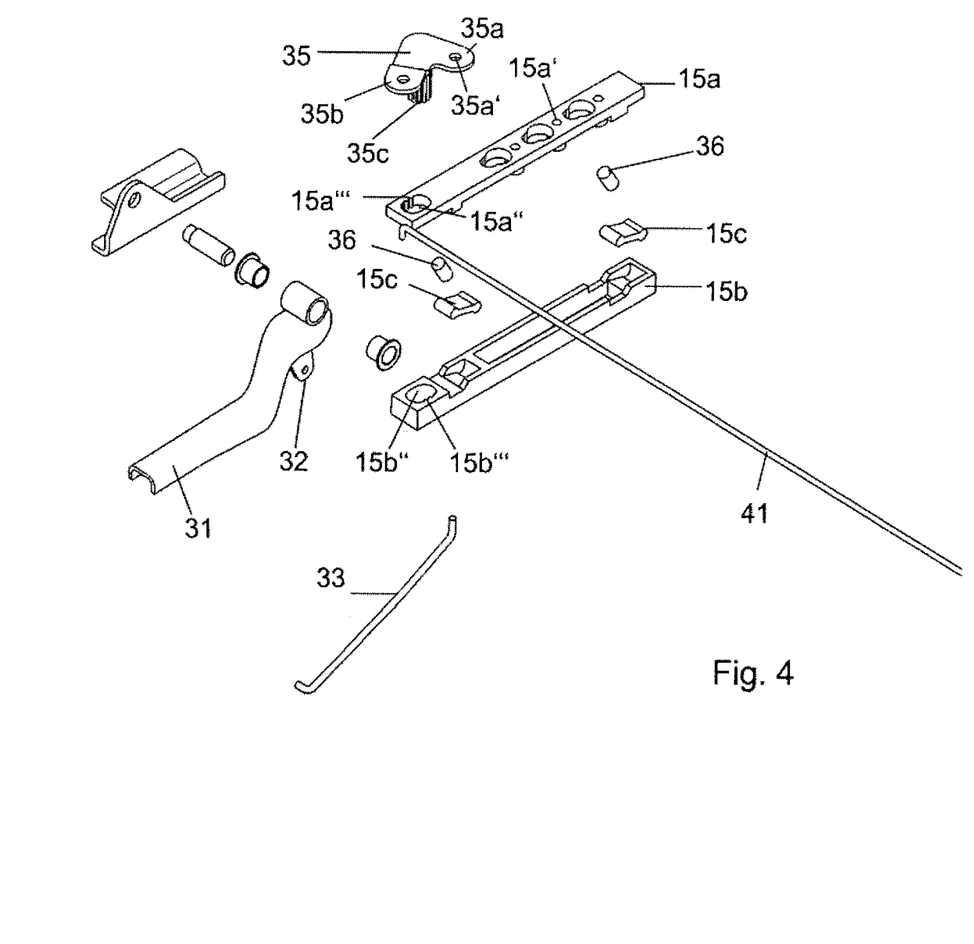
FIG. 4 is an exploded view according to FIG. 2.

The tooth arrangement 15a''' is in this instance arranged at the side facing away from the arms 35a, 35b in the locked position of the seat rail pair 5, 8, as can be seen in FIG. 4. The opening 15b" in the stop 15b is constructed as an elongate hole of corresponding size, a tooth arrangement 15b''' being arranged at the side of the elongate hole opposite the tooth arrangement 15a''', with which tooth arrangement the tooth arrangement of the actuation region 35c is also in engagement.

Owing to a rotational movement about the z axis of the actuation region 35c—when viewed relative to the actuation region 35c—the base carrier 15a consequently moves in one direction and the stop 15b moves in the opposite direction. Since the base carrier 15a is secured to the rail, both the actuation region 35c moves by a first distance L1 and the stop 15b moves by a second distance L2, the second distance L2 which corresponds to the relative displacement in the longitudinal seat direction x between the base carrier 15a and the stop 15b being twice as large as the first distance L1 relative to the second seat rail 8.

Figure 6:
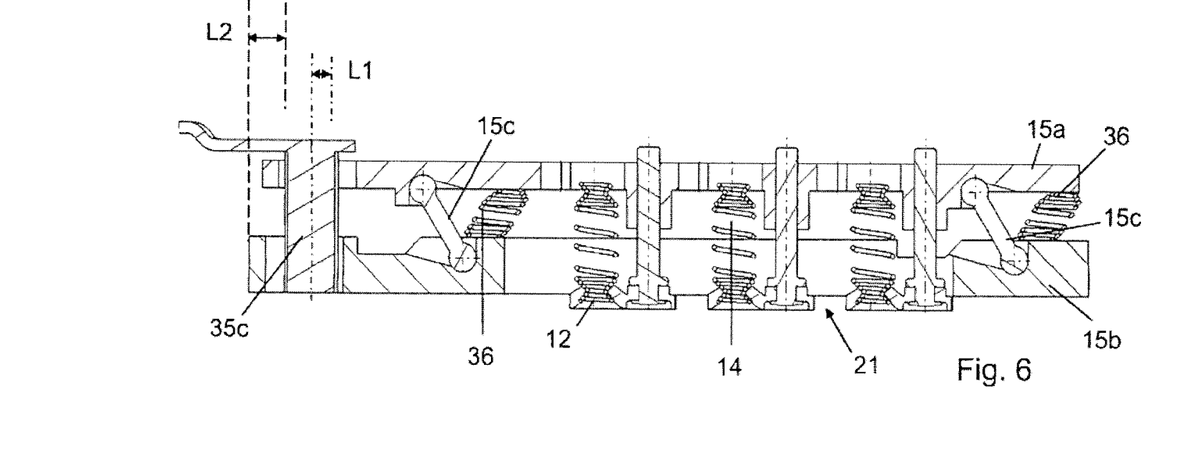
FIG. 6 is a schematic longitudinal section through the locking device in an unlocked position, with a schematic illustration of second tension springs.
Figures 7, 8:
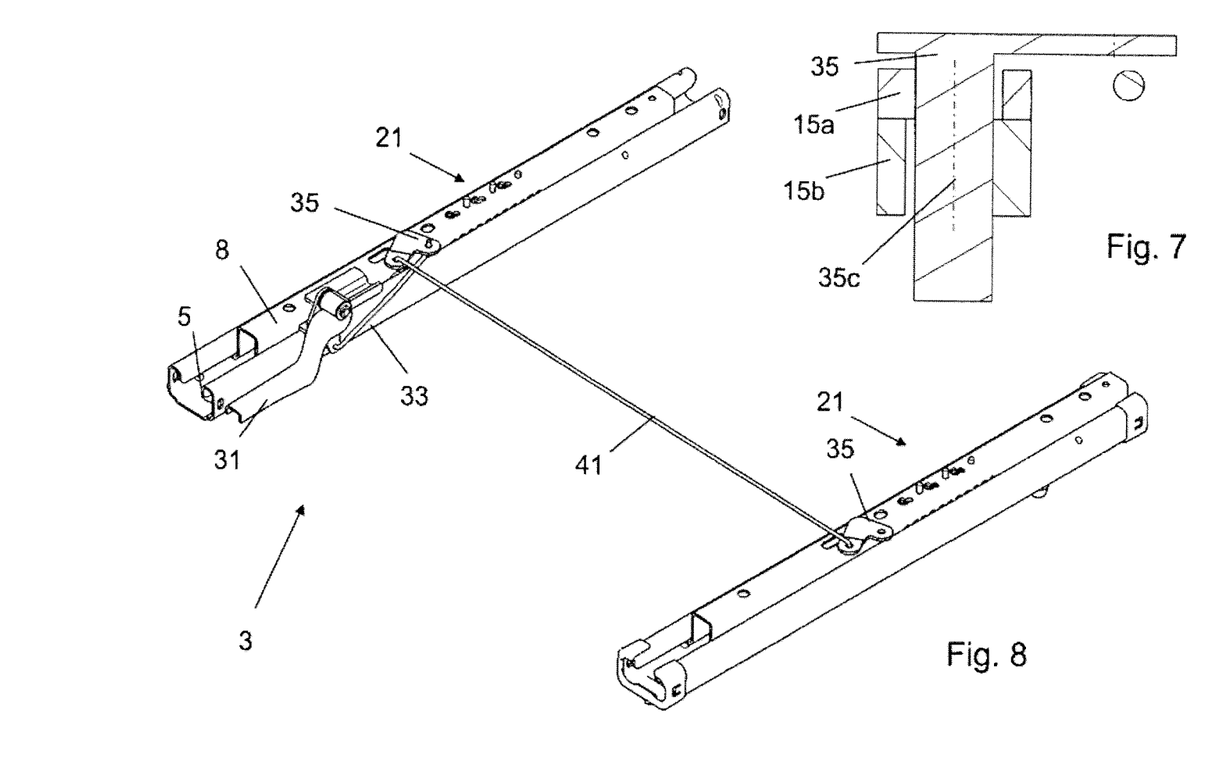
FIG. 7 is a schematic section transversely through the locking device in a locked position.
FIG. 8 is a general perspective view of the seat rail pair of FIG. 1 and the second seat rail pair of the vehicle seat.
Figures 9, 10:
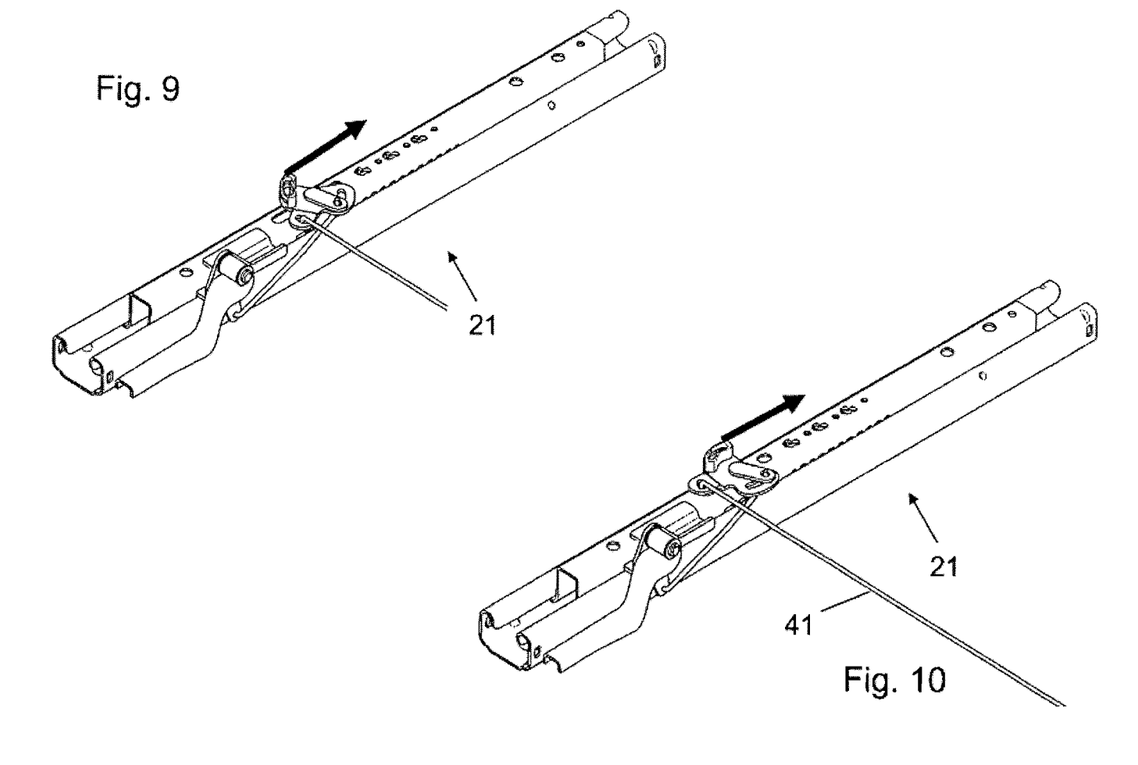
FIG. 9 is a perspective cutout of a locked seat rail pair for a longitudinally adjustable vehicle seat having a locking device according to the second embodiment.
FIG. 10 is a view corresponding to FIG. 9 in an unlocked position as a result of the backrest being pivoted forward.
Figure 11:
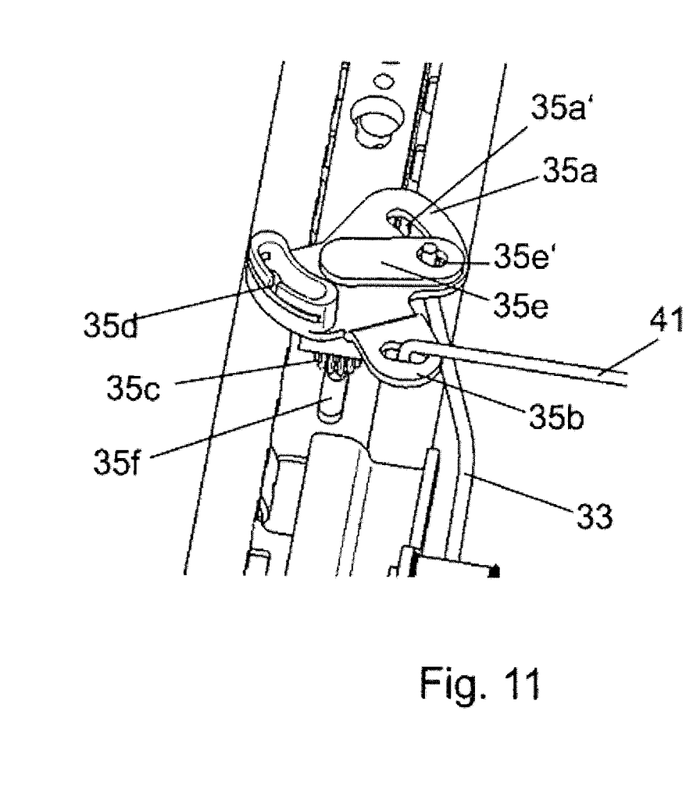
FIG. 11 is a detailed view of FIG. 9.

The base carrier 15a and the stop 15b are further connected to each other by means of two bone-like coupling elements 15c, in the form of a parallelogram, the coupling elements 15c each being arranged on both the base carrier 15a and the stop 15b so as to be able to be pivoted about the y axis. The pretensioning of the stop 15b in the direction of the base carrier 15a is carried out by means of two second tension springs 36, which are fitted between the base carrier 15a and the stop 15b. The tension springs 36 are only schematically indicated in FIG. 6. Preferably, they are substantially arranged at a 90° angle relative to the coupling elements 15c.

Figure 5:
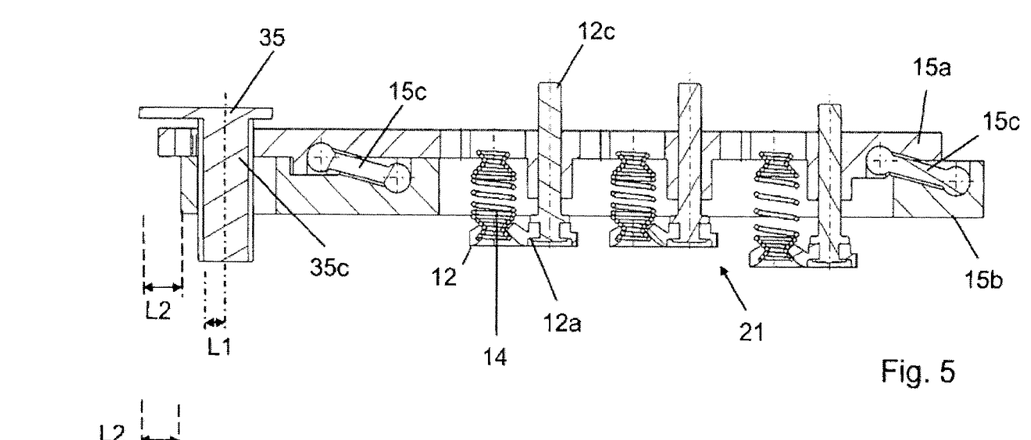
FIG. 5 is a schematic longitudinal section through the locking device in a locked position.

If, after the handle 31 has been actuated and consequently the drive element 35 has been rotated over the actuation region 35c, starting from the locked position (see FIG. 5), by the tooth arrangement of the actuation region 35c rolling in the tooth arrangements 15a''' and 15b''', there is a relative displacement of the base carrier 15a and stop 15b by the second distance L2, then at the same time, via the coupling elements 15c which become upright during the unlocking action, there is also a relative displacement of the base carrier 15a and stop 15b in the locking direction z (see FIG. 6), the engagement region of the tooth arrangement 15b''' also being displaced downward into the actuation region 35c.

The stop 15b comes into contact with all the catch plates 12 at the latest when it is moved downward with the lower side thereof from above and presses them downward—counter to the pretensioning of the tension springs 14—out of the catches so that the engagement of the teeth 12b and consequently also the locking of the seat rails 5, 8 is released. In this instance, there is also a given relative movement of the stop 15b with respect to the catch plates 12 in the longitudinal seat direction x.

After the catch plates 12 have become disengaged, the second seat rail 8 can be displaced relative to the first seat rail 5. In this instance, the distance L2 is substantially of such a size that it corresponds to the relative displacement of the stop 15b with respect to the base carrier 15a in the locking direction z.

If the handle 31 is released, the restoring spring 34 pulls the handle 31 into its initial position again and the tensile force of the tension springs 14 and 36 is predominant so that the stop 15b is pulled upward again, whereby, owing to the coupling elements 15c, the longitudinal sides of the parallelogram, that is to say, the base carrier 15a and stop 15b, move closer again and the catch plates 12 can thereby engage again so that the seat rails 5, 8 are locked again.

The transmission of movement to the locking system of the second seat rail pair 5, 8 is carried out by means of a second transmission rod 41, which is rigidly connected to the second arm 35b of the drive element 35 in terms of tension. Furthermore, the handle 31 together with the retention member arrangement and restoring spring 34 may be dispensed with. Otherwise, the structure and the function correspond to that described above so that this will not be discussed in greater detail. Alternatively to the second transmission rod 41, other transmission means may also be provided, such as in particular a Bowden cable.

Consequently, with both seat rail pairs 5, 8 a four-bar linkage, which is arranged in this case completely inside the second seat rail 8, acts as an unlocking device, comprising the base carrier 15a (or optionally the corresponding region of the second seat rail 8 in the case of direct fixing thereto), the stop 15b and the two coupling elements 15c, which are arranged in this instance in the form of a parallelogram.

The activation is carried out by means of a relative displacement of the longitudinal sides of the four-bar linkage, whereby the short sides necessarily become raised and the longitudinal sides are pressed apart. Accordingly, the deactivation is carried out by means of a relative displacement in the opposite direction, whereby the short sides lie down and the longitudinal sides move toward each other.

According to an alternative construction of the first embodiment, not illustrated in the drawings, the function of the coupling elements and the second tension springs is combined. Thus, the coupling elements are constructed in the manner of a leg spring, one leg being fitted to the base carrier (or to the stop) and the second leg forming the corresponding coupling element.

The second embodiment is explained in greater detail below with reference to FIGS. 9 to 16. Elements which are the same or which have the same function are provided below with the same reference numerals. In this instance, the basic principle of unlocking by means of a four-bar linkage corresponds to the basic principle described with reference to the first embodiment so that this is not discussed in greater detail.

Unlike the first embodiment, the drive element 35 on the seat rail pair 5, 8 on the handle side is modified in the outwardly projecting region thereof. Additional functions are further provided, such as in particular an unlocking action of the seat rails 5, 8 at both sides if the backrest of the vehicle seat 1 is folded forward in order to take up an easy entry position and a memory function for automatically returning to the original seat position after taking up the easy entry position which is only provided in the seat rail pair 5, 8 at the handle side, as described below. The second seat rail pair 5, 8 of the second embodiment which is not described in greater detail corresponds to the corresponding seat rail pair of the first embodiment.

The drive element 35 has the said first arm 35a, in which the first transmission rod 33 engages. Unlike the first embodiment, the engagement opening 35a' for the first transmission rod 33 is not constructed as a circular opening but instead as a curved elongate hole, for which purpose the arm width of the first arm 35a is also increased.

Unlike the first embodiment, the opening in the second arm 35b of the drive element 35 is also not constructed as a circular opening but instead as an elongate hole in order to allow a given play. In this instance, however, the drive element (not illustrated) on the second seat rail pair 5, 8 is constructed in accordance with the first embodiment. However, it is also possible to have a construction in accordance with the drive element 35 of the second embodiment and as explained in greater detail below if a corresponding transmission means and optionally a memory function is also provided at this side in order to take up the easy entry position.

A suspension 35d for a Bowden cable nipple of a Bowden cable which is not illustrated in greater detail and which is activated when the backrest of the vehicle seat 1 is folded forward is provided at the upper side of the drive element 35. Consequently the Bowden cable forms a second actuation device in order to release the locking device 21. The suspension 35d has a given play so that, when the drive element 35 is actuated via the handle 31, no forces or only insignificant forces act on the Bowden cable whereas the drive element 35 is rotated when the backrest is folded in order to take up the easy entry position.

Furthermore, a signal lever 35e which is pivotably fitted at one end to the upper side of the drive element 35 is provided at the upper side of the drive element 35, with the pivot axis of the signal lever 35e being aligned with the longitudinal center axis of the actuation region 35c. There is constructed at the other end of the signal lever 35e an engagement opening 35e', in which the first transmission rod 33 engages after it is guided through the engagement opening 35a' in the form of a curved elongate hole in the first arm 35a. There is further provided at the lower end of the actuation region 35c a memory activation lever 35f which is connected to the signal lever 35e in a torsionally rigid manner and which is rotatably supported inside the drive element 35, that is to say, the signal lever 35e and memory activation lever 35f can be rotated relative to the drive element 35.

The function of the drive element 35 is as follows when the backrest of the vehicle seat 1 is pivoted forward: activation of the Bowden cable occurs by the backrest being pivoted forward so that the Bowden cable nipple suspended in the suspension 35d pulls on the drive element 35 and rotates it, with the rotational movement of the drive element 35 being superimposed with a longitudinal movement owing to the effect of the tooth arrangement secured to the rail on the base carrier 15a.

The rotational/longitudinal movement is transmitted by the actuation region 35c provided with the tooth arrangement in accordance with the first embodiment so that the four-bar linkage is activated, that is to say, the longitudinal sides of the parallelogram are displaced relative to each other and move apart owing to the coupling elements 15c so that the catch plates are pressed downward and the seat rails 5, 8 are unlocked. Since the first transmission rod 33 protrudes with its end through the engagement opening 35a' in the form of a curved elongate hole, no force transmission to the first transmission rod 33 and therefore the handle 31 is produced in the event of rotational movement of the drive element 35.

The signal lever 35e does not remain completely in its initial position owing to the longitudinal movement portion of the rotational/longitudinal movement of the drive element 35. In this instance, it moves within the region of the engagement opening 35a' from one side of the first arm 35a to the other side of the first arm 35a and is rotated in an insignificant manner counter to the direction of rotation of the drive element 35.

Figure 12:
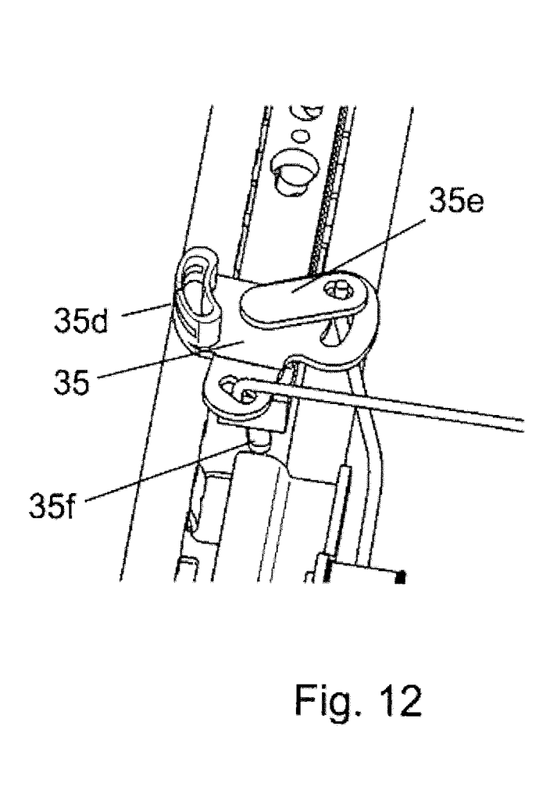
FIG. 12 is a detailed view of FIG. 10.
Figures 13, 14:
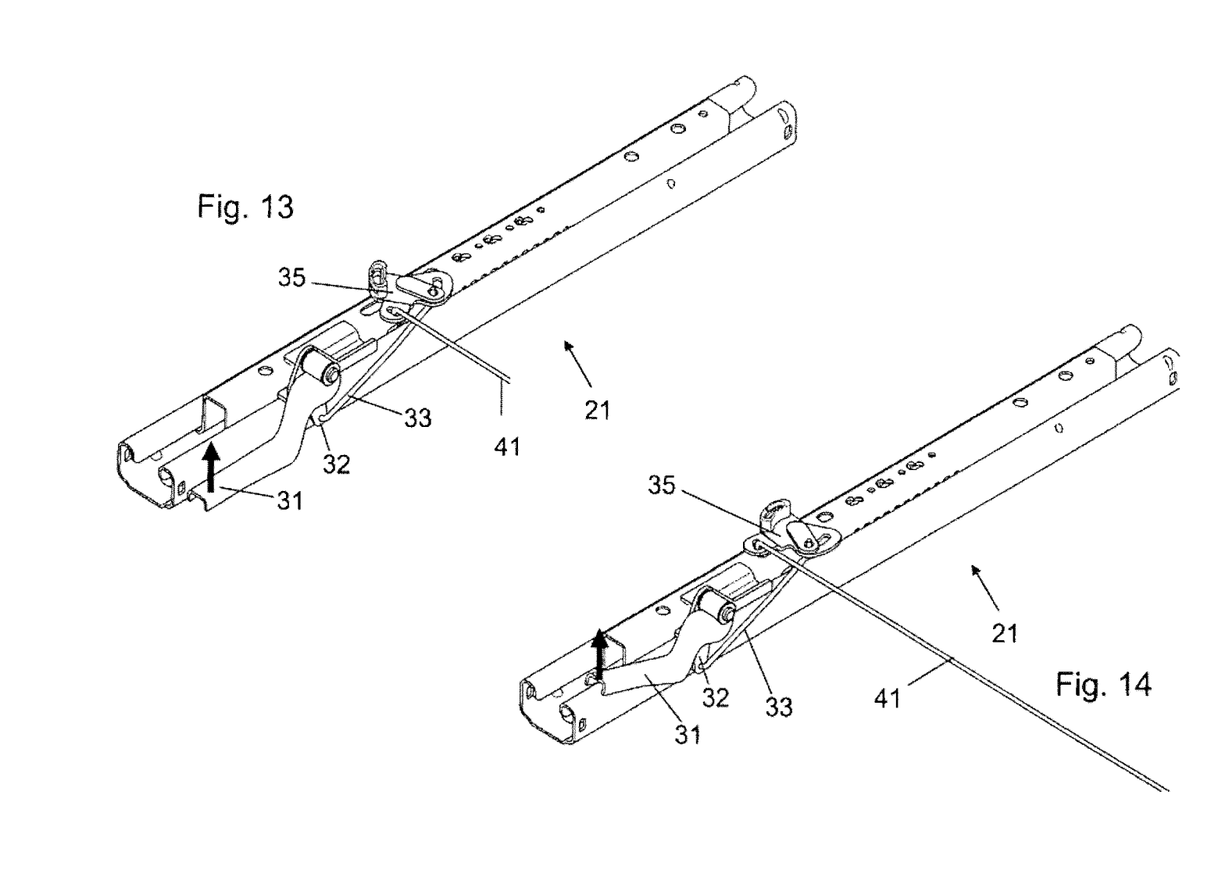
FIG. 13 is a view corresponding to FIG. 9.
FIG. 14 is a view corresponding to FIG. 9 in an unlocked position as a result of the handle being actuated.
Figure 15:
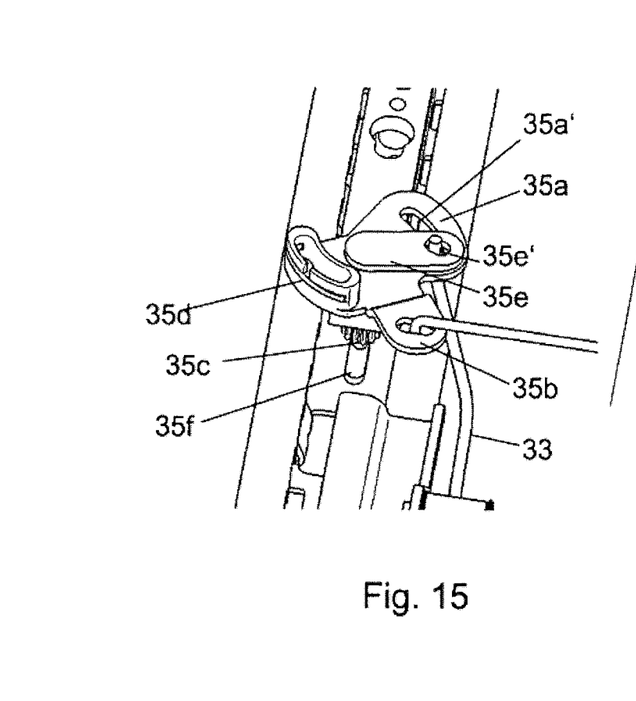
FIG. 15 is a detailed view of FIG. 13.

This rotational movement is also transmitted to the memory activation lever 35f, as can be seen in FIG. 12. In this instance, this movement brings about non-movement of a memory element so that the current longitudinal seat position is stored mechanically and the initial position is automatically taken up again when the vehicle seat 1 is moved backward in order to lock the seat rail pairs 5, 8. However, the movement may be used for any other memory device.

The locking device 21 of the second seat rail pair 5, 8 appears in accordance with the locking device of the first seat rail pair of the first embodiment. The release thereof is carried out on the basis of the transmission by the second transmission rod 41.

In the event of manual release of the locking device 21 by means of actuation of the handle 31, the function corresponds to that of the first embodiment, the signal lever 35e and therefore also the memory activation lever 35f also being carried when the drive element 35 is activated by pulling on the first transmission rod 33.

That movement of the signal lever 35e brings about rotation of the memory activation lever 35f which is rotated in the same direction as the drive element 35. In this instance, the memory activation lever 35f carries the memory element, that is to say, a "reset" of the memory device is produced.

In an alternative embodiment, it is also possible to unlock the seat rail pair 5, 8 when the backrest is folded forward by means of activation via a Bowden cable in accordance with the above-described activation according to the second embodiment.

A memory function may also be provided in the second seat rail pair but generally it is provided only in one of the two seat rail pairs.

Although a base carrier 15a which is part of the locking device 21 is provided above in both embodiments, the base carrier 15a may also be dispensed with in principle and the function thereof may be taken up directly by a corresponding construction of the second seat rail 8.

LIST OF REFERENCE NUMERALS

1 Vehicle seat
3 Longitudinal adjuster
5 First seat rail
8 Second seat rail
8a Guide opening
12 Catch plate
12a Base member
12b Tooth
12c Guide pin
14 Tension spring
15a Base carrier
15a' Guide opening
15a" Opening
15a''' Tooth arrangement
15b Stop
15b" Opening
15b''' Tooth arrangement
15c Coupling element
21 Locking device
31 Handle
32 Lever arm
33 First transmission rod
34 Restoring spring
35 Drive element
35a First arm
35a' Engagement opening
35b Second arm
35c Actuation region
35d Suspension
35e Signal lever
35e' Engagement opening
35f Memory activation lever
36 Second tension spring
41 Second transmission rod
L1 First distance
L2 Second distance
x Longitudinal seat direction
y Transverse direction
z Locking direction

The invention claimed is:

1. A longitudinal adjuster for a vehicle seat, comprising:
a seat rail pair, having a first seat rail fixed to a structure, a second seat rail which is guided in that first seat rail and which is connected to the vehicle seat, and a releasable locking device having at least one catch plate for releasably locking the position of the first seat rail relative to the second seat rail,
wherein a four-bar linkage, which cooperates with the at least one catch plate in order to unlock the longitudinal adjuster, is provided within the second seat rail,
wherein the four-bar linkage is in the form of a parallelogram, wherein one side is secured to a rail in relation to the second seat rail and a side parallel therewith cooperates with the at least one catch plate.

2. The longitudinal adjuster as claimed in claim 1, wherein the four-bar linkage has two coupling elements which are secured to a rail at one end and a stop which is arranged at the other ends of the coupling elements and which is movable at least in a longitudinal seat direction relative to the at least one catch plate.

3. The longitudinal adjuster as claimed in claim 2, wherein the stop cooperates with the at least one catch plate in order to release the locking device and presses the at least one catch plate out of engagement with the first seat rail from a side of the second seat rail.

4. The longitudinal adjuster as claimed in claim 1, wherein the actuation of the four-bar linkage is carried out via a gear connection which has an actuation region having an outer tooth arrangement and two elongate holes having tooth arrangements arranged at opposite sides, and the tooth arrangements are in engagement with the outer tooth arrangement of the actuation region.

5. The longitudinal adjuster as claimed in claim 1, wherein the four-bar linkage has a base carrier which is securely fitted to the second seat rail, two coupling elements which are pivotably connected to the base carrier and a stop which is also connected pivotably to the coupling elements, wherein the stop is pretensioned by tension springs from below against the base carrier.

6. The longitudinal adjuster as claimed in claim 1, wherein the longitudinal adjuster has a memory device which is activated by a second actuation device when the locking device is unlocked.

7. The longitudinal adjuster as claimed in claim 6, wherein a rotational movement which is transmitted coaxially relative to an axis of rotation through a drive element is used for activating the memory device, wherein the drive element brings about actuation of the four-bar linkage.

8. The longitudinal adjuster as claimed in claim 6, wherein the second actuation device for the memory device cooperates with a signal lever which cooperates with a shaft supported in a drive element and a memory activation lever.

9. A vehicle seat having at least one longitudinal adjuster as claimed in claim 1.

* * * * *